(12) United States Patent
Bai et al.

(10) Patent No.: US 12,512,879 B2
(45) Date of Patent: Dec. 30, 2025

(54) TRANSMISSION CONTROL METHOD, DEVICE AND RECONFIGURE INTELLIGENT SURFACE

(71) Applicant: DATANG MOBILE COMMUNICATIONS EQUIPMENT CO., LTD., Beijing (CN)

(72) Inventors: Wei Bai, Beijing (CN); Shiqiang Suo, Beijing (CN); Xin Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 432 days.

(21) Appl. No.: 18/252,625

(22) PCT Filed: Nov. 26, 2021

(86) PCT No.: PCT/CN2021/133504
§ 371 (c)(1),
(2) Date: May 11, 2023

(87) PCT Pub. No.: WO2022/121706
PCT Pub. Date: Jun. 16, 2022

(65) Prior Publication Data
US 2024/0014863 A1 Jan. 11, 2024

(30) Foreign Application Priority Data

Dec. 10, 2020 (CN) .......................... 202011454063.6

(51) Int. Cl.
*H04B 7/04* (2017.01)
(52) U.S. Cl.
CPC ............................... *H04B 7/04013* (2023.05)

(58) Field of Classification Search
CPC ............ H04B 7/04013; H04B 7/0626; H04W 64/003; H04W 16/26; H04W 16/18; H04W 24/02; Y02D 30/70
See application file for complete search history.

(56) References Cited

U.S. PATENT DOCUMENTS

| 11,289,817 B2 * | 3/2022 | Somerlock, III .. H01Q 15/0033 |
| 2003/0112186 A1 * | 6/2003 | Sanchez ................... H01Q 9/27 343/909 |

(Continued)

OTHER PUBLICATIONS

Extended European Search Report for the corresponding European Patent Application No. 21902413.0 issued by the European Patent Office on Apr. 25, 2024.

(Continued)

*Primary Examiner* — Kabir A Timory
(74) *Attorney, Agent, or Firm* — Ladas & Parry, LLP (57) ABSTRACT

A transmission control method, a device and a reconfigure intelligent surface are provided. The method in the present disclosure is performed by a reconfigure intelligent surface (RIS), the RIS includes a plurality of RIS atoms and a plurality of connectors, where each of the plurality of connectors is configured to control a connection state of the plurality of RIS atoms around the connector; the method includes: determining a setting parameter of a RIS unit; determining the connection state of the plurality of RIS atoms around the connector according to the setting parameter, and determining the RIS unit according to the connection state; where at least one of the RIS atoms constitutes one RIS unit, the setting parameter includes a center distance between multiple RIS units.

19 Claims, 3 Drawing Sheets

(56) References Cited

U.S. PATENT DOCUMENTS

2019/0044246 A1    2/2019   Pitsillides et al.
2022/0059943 A1*   2/2022   Saab .................... H04B 7/0617

OTHER PUBLICATIONS

"Beamforming Design for Multiuser Transmission Through Reconfigurable Intelligent Surface," Yang Zhaohui et al, IEEE Transactions on Communications, pp. 589-601, vol. 69, No. 1, Jan. 2021.

* cited by examiner

TRANSMISSION CONTROL METHOD, DEVICE AND RECONFIGURE INTELLIGENT SURFACE

CROSS-REFERENCE TO RELATED APPLICATIONS

The present disclosure is the U.S. national phase of PCT Application PCT/CN2021/133504 filed on Nov. 26, 2021, which claims a priority to Chinese patent application No. 202011454063.6 filed on Dec. 10, 2020, the disclosures of which are incorporated herein by reference in their entireties.

TECHNICAL FIELD

The present disclosure relates to the field of communications technologies, and in particular, to a transmission control method, a device, and a reconfigure intelligent surface.

BACKGROUND

With the development of mobile communication, various organizations have started to research a new generation of wireless communication system, i.e., 6G. Reconfigure Intelligent Surfaces (RIS) technology was first studied by scientists in electromagnetism and materials science and then introduced into practical applications such as electromagnetic stealth materials, perfect lenses, holographic imaging, terahertz sensing, radar beam scanning, etc. The reconfigure intelligent surface technology is widely concerned in the industry, especially in the communication field, and is about to be introduced into a 6G communication system to improve the communication quality of a high-frequency communication system and improve the energy efficiency and the spectrum efficiency. The reconfigure intelligent surface is considered as one of the potentially critical technologies for 6G systems.

However, the reconfigure intelligent surface adjustable phase and amplitude RIS unit in the related art is fixedly set or can be set in only a few states, but cannot meet the requirements of RIS use.

SUMMARY

The present disclosure aims to provide a transmission control method, a transmission control device and an reconfigure intelligent surface, which are used for realizing flexible setting of RIS reflection coefficients and reducing the cost of RIS realization and control.

In order to achieve the above object, a transmission control method is provided in an embodiment of the present disclosure, performed by Reconfigure Intelligent Surface (RIS) including a plurality of RIS atoms and a plurality of connectors, where each of the plurality of connectors is configured to control a connection state of the plurality of RIS atoms around the connector;

the method includes:
determining a setting parameter of a RIS unit;
determining the connection state of the plurality of RIS atoms around the connector according to the setting parameter, and determining the RIS unit according to the connection state;
where at least one of the RIS atoms constitutes one RIS unit, the setting parameter includes a center distance between multiple RIS units.

Optionally, prior to the determining the setting parameter of the RIS unit, the method further includes:
obtaining target information;
where the target information includes at least one of:
Channel State information (CSI);
transmitting end location information;
receiving end location information;
RIS location information;
RIS area information;
RIS power consumption information.

Optionally, the determining the setting parameter of the RIS unit includes:
determining the setting parameter of the RIS unit according to a first angle, a second angle, a third angle and a fourth angle;
the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.

Optionally, the center distance between multiple RIS units includes at least one of:
the center distance between two adjacent RIS units in a RIS first direction;
the center distance between two adjacent RIS units in a RIS second direction;
the determining the setting parameter of the RIS unit according to the first angle, the second angle, the third angle and the fourth angle comprises:
calculating a first parameter $\delta_1$ through a formula $\delta_1 = \sin\theta_t \cos\varphi_t + \sin\theta_r \cos\varphi_r$;
calculating a second parameter through a formula $\delta_2 = \sin\theta_t \cos\varphi_t + \sin\theta_r \cos\varphi_r$;
determining $d_x$ and/or $d_y$ based on a RIS setting parameter table, where $d_x$ satisfies a formula $Kd_x = \lambda/\delta_1$, $d_y$ satisfies a formula $Kd_y = \lambda/\delta_2$;
where $\theta_t$ is the first angle, $\varphi_t$ is the second angle, $\theta_r$ is the third angle, $\varphi_r$ is the fourth angle, $d_x$ is the center distance between two adjacent RIS units in the RIS first direction, $d_y$ is the center distance between two adjacent RIS units in the RIS second direction, $\lambda$ is a wavelength, and K is a number of phase shifts.

Optionally, subsequent to the determining the setting parameter of the RIS unit, the method further includes:
determining a reflection parameter of each RIS unit, according to RIS area information, RIS power consumption information and the setting parameter of each RIS unit.

Optionally, the reflection parameter includes a reflection amplitude;
the determining the reflection parameter of each RIS unit according to the RIS area information, the RIS power consumption information and the setting parameter of each RIS unit includes:
calculating a reflection amplitude A of each RIS unit through a formula $$A = \sqrt{\frac{P * d_x * d_y}{S}};$$

where P is a power consumption of RIS, S is an area of RIS, $d_x$ is the center distance between two adjacent RIS units in the RIS first direction, $d_y$ is the center distance between two adjacent RIS units in the RIS second direction.

Optionally, the determining the connection state of the plurality of RIS atoms around the connector and determining the RIS unit according to the connection state includes:

configuring the RIS as the plurality of RIS units satisfying the setting parameter, through the plurality of connectors;

where each of the plurality of connectors is configured to perform at least one of:

controlling the plurality of RIS atoms around the connector to be unconnected;

controlling a part of the plurality of RIS atoms around the connector to be connected;

controlling the plurality of RIS atoms around the connector to be connected.

In order to achieve the above object, a transmission control device is provided in an embodiment of the present disclosure, including a plurality of RIS atoms and a plurality of connectors, where each of the plurality of connectors is configured to control a connection state of the plurality of RIS atoms around the connector;

the device includes:

a first processing module, configured to determine a setting parameter of a MS unit;

a second processing module, configured to determine the connection state of the plurality of RIS atoms around the connector according to the setting parameter, and determine the RIS unit according to the connection state;

where at least one of the RIS atoms constitutes one RIS unit, the setting parameter comprises a center distance between multiple RIS units.

Optionally, the device further includes:

an obtaining module, configured to obtain target information;

where the target information includes at least one of:

Channel State information (CSI);
transmitting end location information;
receiving end location information;
RIS location information;
RIS area information;
RIS power consumption information.

Optionally, the first processing module is further configured to:

determine the setting parameter of the RIS unit according to a first angle, a second angle, a third angle and a fourth angle;

the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.

Optionally, the center distance between multiple RIS units includes at least one of:

the center distance between two adjacent RIS units in a RIS first direction;

the center distance between two adjacent RIS units in a RIS second direction;

the determining the setting parameter of the RIS unit according to the first angle, the second angle, the third angle and the fourth angle includes:

calculating a first parameter $\delta_1$ through a formula $\delta_1 = \sin\theta_t \cos\varphi_t + \sin\theta_r \cos\varphi_r$;

calculating a second parameter $\delta_2$ through a formula $\delta_2 = \sin\theta_t \cos\varphi_t + \sin\theta_r \cos\varphi_r$;

determining $d_x$ and/or $d_y$ based on a RIS setting parameter table, where $d_x$ satisfies a formula $Kd_x = \lambda/\delta_1$, $d_y$ satisfies a formula $Kd_y = \lambda/\delta_2$;

where $\theta_t$ is the first angle, $\varphi_t$ is the second angle, $\theta_r$ is the third angle, $\varphi_r$ is the fourth angle, $d_x$ is the center distance between two adjacent RIS units in the RIS first direction, $d_y$ is the center distance between two adjacent RIS units in the RIS second direction, $\lambda$ is a wavelength, and K is a number of phase shifts.

Optionally, the device further includes:

a third processing module, configured to determine a reflection parameter of each RIS unit, according to RIS area information, RIS power consumption information and the setting parameter of each RIS unit.

Optionally, the reflection parameter includes a reflection amplitude;

the third processing module is further configured to:

calculate a reflection amplitude A of each RIS unit through a formula $$A = \sqrt{\frac{P * d_x * d_y}{S}};$$

where P is a power consumption of RIS, S is an area of RIS, $d_x$ is the center distance between two adjacent RIS units in the RIS first direction, $d_y$ is the center distance between two adjacent RIS units in the RIS second direction.

Optionally, the second processing module is configured to:

configure the RIS as the plurality of RIS units satisfying the setting parameter, through the plurality of connectors;

where each of the plurality of connectors is configured to perform at least one of:

controlling the plurality of RIS atoms around the connector to be unconnected;

controlling a part of the plurality of RIS atoms around the connector to be connected;

controlling the plurality of RIS atoms around the connector to be connected.

In order to achieve the above object, a transmission control device is provided in an embodiment of the present disclosure, comprising: a memory, a transceiver, a processor;

where the memory is configured to store program instructions, the transceiver is configured to send and receive data under a control of the processor, and the processor is configured to read the program instructions in the memory and perform:

determining a setting parameter of a RIS unit;

determining the connection state of the plurality of RIS atoms around the connector according to the setting parameter, and determining the RIS unit according to the connection state;

where at least one of the RIS atoms constitutes one RIS unit, the setting parameter comprises a center distance between multiple RIS units.

Optionally, the processor is further configured to perform:

acquiring target information;

where the target information includes at least one of:

Channel State information (CSI);
transmitting end location information;

receiving end location information;
RIS location information;
RIS area information;
RIS power consumption information.

Optionally, the processor is further configured to perform:
determining the setting parameter of the RIS unit according to a first angle, a second angle, a third angle and a fourth angle;
the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.

Optionally, the center distance between multiple RIS units includes at least one of:
the center distance between two adjacent RIS units in a RIS first direction;
the center distance between two adjacent RIS units in a RIS second direction;
the determining the setting parameter of the RIS unit according to the first angle, the second angle, the third angle and the fourth angle includes:
calculating a first parameter $\delta_1$ through a formula $\delta_1=\sin\theta_t \cos\varphi_t+\sin\theta_r \cos\varphi_r$;
calculating a second parameter $\delta_2$ through a formula $\delta_2=\sin\theta_t \cos\varphi_t+\sin\theta_r \cos\varphi_r$;
determining $d_x$ and/or $d_y$ based on a RIS setting parameter table, where $d_x$ satisfies a formula $Kd_x=\lambda/\delta_1$, $d_y$ satisfies a formula $Kd_y=\lambda/\delta_2$;
where $\theta_t$ is the first angle, $\varphi_t$ is the second angle, $\theta_r$ is the third angle, $\varphi_r$ is the fourth angle, $d_x$ is the center distance between two adjacent RIS units in the RIS first direction, $d_y$ is the center distance between two adjacent RIS units in the RIS second direction, $\lambda$ is a wavelength, and K is a number of phase shifts.

Optionally, the reflection parameter includes a reflection amplitude;
the processor is further configured to perform:
calculating a reflection amplitude A of each RIS unit through a formula $$A = \sqrt{\frac{P*d_x*d_y}{S}};$$

where P is a power consumption of RIS, S is an area of RIS, $d_x$ is the center distance between two adjacent RIS units in the RIS first direction, $d_y$ is the center distance between two adjacent RIS units in the RIS second direction.

Optionally, the processor is further configured to perform:
configuring the RIS as the plurality of RIS units satisfying the setting parameter, through the plurality of connectors;
where each of the plurality of connectors is configured to perform at least one of:
controlling the plurality of RIS atoms around the connector to be unconnected;
controlling a part of the plurality of RIS atoms around the connector to be connected;
controlling the plurality of RIS atoms around the connector to be connected.

In order to achieve the above object, a reconfigure intelligent surface is provided in an embodiment of the present disclosure, for performing the transmission control method hereinabove, where the reconfigure intelligent surface includes a plurality of RIS atoms and a plurality of connectors,
where each of the plurality of connectors is configured to control a connection state of the plurality of RIS atoms around the connector;
at least one of the RIS atoms constitutes one RIS unit.

Optionally, the connector is configured to perform at least one of:
controlling the plurality of RIS atoms around the connector to be unconnected;
controlling a part of the plurality of RIS atoms around the connector to be connected;
controlling the plurality of RIS atoms around the connector to be connected.

In order to achieve the above object, a processor-readable storage medium is provided in an embodiment of the present disclosure, where the processor-readable storage medium stores a computer program, the computer program is executed by a processor to perform the transmission control method hereinabove.

The technical scheme of the present disclosure at least has the following beneficial effects:
according to the embodiment of the present disclosure, a setting parameter of a RIS unit is determined firstly, that is, a center distance between multiple RIS units is determined, then the connection state of the multiple RIS atoms around the connector can be further determined according to the setting parameter, and the RIS unit is determined according to the connection state, so that the RIS can be subsequently transmitted based on the obtained RIS unit, thereby realizing flexible setting of the RIS reflection coefficient, and reducing the cost for implementing and controlling the RIS.

DETAILED DESCRIPTION

The term "and/or" in the embodiments of the present disclosure describes an association relationship of associated objects, and indicates that three relationships may exist, for example, A and/or B, and may indicate: A exists alone, A and B exist simultaneously, and B exists alone. The character "I" generally indicates that the former and latter associated objects are in an "or" relationship.

In the embodiments of the present disclosure, the term "plurality" means two or more, and other terms are similar thereto.

The technical solutions in the embodiments of the present disclosure will be clearly and completely described below with reference to the drawings in the embodiments of the present disclosure, and it is obvious that the described embodiments are only some embodiments of the present disclosure, and not all embodiments. All other embodiments obtained by a person of ordinary skill in the art based on the embodiments in the present disclosure without making any creative effort belong to the protection scope of the present disclosure.

The embodiment of the disclosure provides a transmission control method and a device. The method and the device are based on the same application concept, and because the principles of solving the problems of the method and the device are similar, the implementation of the device and the method can be mutually referred, and repeated parts are not described again.

Figure 1:
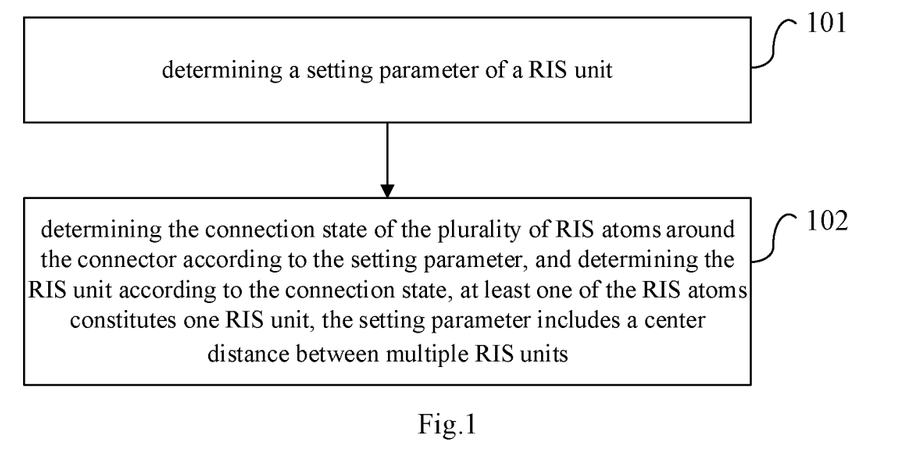
FIG. 1 is a schematic flowchart of a method in an embodiment of the present disclosure.

As shown in FIG. 1, a transmission control method is provided in an embodiment of the present disclosure, performed by a Reconfigure Intelligent Surface (RIS) including a plurality of RIS atoms and a plurality of connectors, where each of the plurality of connectors is configured to control a connection state of the plurality of RIS atoms around the connector;

the method includes:
Step 101: determining a setting parameter of a RIS unit;
Step 102: determining the connection state of the plurality of RIS atoms around the connector according to the setting parameter, and determining the RIS unit according to the connection state;
where at least one of the RIS atoms constitutes one RIS unit, the setting parameter includes a center distance between multiple RIS units.

Figure 2:
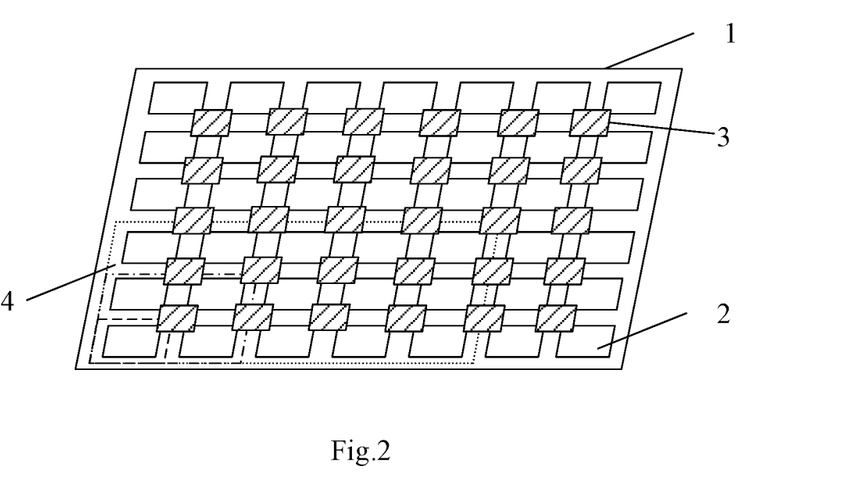
FIG. 2 is a first schematic view of an RIS in an embodiment of the present disclosure.

Here, as shown in FIG. 2, the RIS1, which performs the method of the embodiment of the present disclosure, includes a plurality of RIS atoms 2 and a plurality of connectors 3, where at least one RIS atom 2 can constitute one RIS unit 4, and each connector can control the connection state of a plurality of RIS atoms around itself. In this way, a setting parameter of a RIS unit is determined firstly in Step 101 and Step 102, that is, a center distance between multiple RIS units is determined, then the connection state of the multiple RIS atoms around the connector can be further determined according to the setting parameter, and the RIS unit is determined according to the connection state, so that the RIS can be subsequently transmitted based on the obtained RIS unit, thereby realizing flexible setting of the RIS reflection coefficient, and reducing the cost for implementing and controlling the RIS.

In this embodiment, the RIS atom, as the smallest physical element on the RIS, includes a metal patch, a diode, and a non-metal structure on which the metal patch and the diode are disposed, or a plurality of RIS atoms share a diode. The diode is connected with the metal patch. The connectors are attached to each around RIS atom, and control the configuration of the RIS unit, which is the minimum unit for signal reflection or transmission.

The length and width of the RIS atoms can be one tenth of the wavelength or even smaller. The size of the RIS unit is between one tenth and one half of the wavelength.

Optionally, before Step 10, the method further includes:
obtaining target information;
where the target information includes at least one of:
Channel State information (CSI);
transmitting end location information;
receiving end location information;
RIS location information;
RIS area information;
RIS power consumption information.

Here, the target information is used to determine the setting parameter and/or reflection parameter of the RIS unit, therefore the RIS needs to obtain the target information first for subsequent use.

If the target information can be stored locally (as predefined), the target information is obtained as local extraction; the target information may be notified by other devices (e.g., a base station), and the target information is obtained as the target information sent by the receiving base station.

Optionally, Step 101 includes:
determining the setting parameter of the RIS unit according to a first angle, a second angle, a third angle and a fourth angle;
the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.

In this embodiment, the location information of the transmitting end may include a first angle and a second angle, the location information of the receiving end may include a third angle and a fourth angle, and the RIS may be capable of directly extracting, from the location information of the transmitting end and the location information of the receiving end, each angle required for determining the setting parameter of the RIS unit. Of course, if the location information of the transmitting end and the location information of the receiving end do not include these angles, the required angles may be determined first by combining the RIS location information, and then the setting parameter of the RIS unit are determined by using these angle information.

The angle is an angle observed from the RIS center by drawing a line from the RIS center to the receiving end or the transmitting end.

The setting parameter includes a center distance between multiple RIS units, where the plurality of MS units are optionally adjacent RIS units. In this embodiment, as shown in FIG. 2, the MS units may be arranged in an MS first direction (RIS longitudinal direction) and an MS second direction (MS width direction), and thus, alternatively, the center distance of the plurality of RIS units include at least one of: the center distance between two adjacent RIS units in the RIS first direction; the center distance between two adjacent MS units in the RIS second direction;

the determining the setting parameter of the RIS unit according to the first angle, the second angle, the third angle and the fourth angle includes:
calculating a first parameter $\delta_1$ through a formula $\delta_1 = \sin\theta_t \cos\varphi_t + \sin\theta_r \cos\varphi_r$;
calculating a second parameter $\delta_2$ through a formula $\delta_2 = \sin\theta_t \cos\varphi_t + \sin\theta_r \cos\varphi_r$;
determining $d_x$ and/or $d_y$ based on a RIS setting parameter table, where $d_x$ satisfies a formula $Kd_x = \lambda/\delta_1$, $d_y$ satisfies a formula $Kd_y = \lambda/\delta_2$;
where $\theta_t$ is the first angle, $\varphi_t$ is the second angle, $\theta_r$ is the third angle, $\varphi_r$ is the fourth angle, $d_x$ is the center distance between two adjacent RIS units in the RIS first direction, $d_y$ is the center distance between two adjacent RIS units in the RIS second direction, $\lambda$ is a wavelength, and K is a number of phase shifts.

When K phase shifts are required for the RIS unit, the adjustment particle size of the RIS unit phase shift is $2\pi/K$, and $2\pi/K = 2\pi/\lambda * \delta_1 * d_x = 2\pi/\lambda * \delta_2 * d_y$ is required to be satisfied, so that a preferred $d_x$ is required to satisfy $Kd_x = \lambda/\delta_1$, and a preferred $d_y$ is required to satisfy $Kd_y = \lambda/\delta_2$.

In this embodiment, an RIS setting parameter table is preset, and the RIS setting parameter table at least includes a combination of K, $d_x$ and $d_y$ supported by the RIS, and if (K1, $d_x$1, $d_y$1) is included in the RIS parameter table, it indicates that the RIS can support the parameter combinations K1, $d_x1$, and $d_y1$, that is, the RIS unit can be set to K1 phase shifts, the interval between two adjacent RIS unit columns is $d_x1$, and the interval between two adjacent RIS unit rows is $d_y1$, and of course, the RIS table includes various supported combinations. By looking up the table, the applicable combination of K, $d_x$ and $d_y$ can be determined. Here, determining that the applicable combination of K, $d_x$ and $d_y$ satisfies the formulas $Kd_x=\lambda/\delta_1$ and $Kd_y=\lambda/\delta_2$ means that the combination makes the formula to be workable, or the combination is closest to making the formula workable in the RIS setting parameter table. Of course, if only $d_x$ or $d_y$ needs to be determined independently, then the determined $d_x$ satisfies the formula $Kd_x=\lambda/\delta_1$, without considering $d_y$; it is sufficient that the determined $d_y$ satisfies the formula $Kd_y=\lambda/\delta_2$ without considering $d_x$. Likewise, satisfying the formula includes making the formula to be workable, or closest to making the formula workable.

$d_x$ and $d_y$ may be between one tenth and one half of the wavelength.

In addition, the RIS setting parameter table is also adjusted based on the usage, for example, for the determined $d_x$ and $d_y$, if it is larger than $\lambda/2$, i.e., $K\times\delta_1<2$ and/or $K\times\delta_2<2$, then K needs to be increased, otherwise the beamforming is disturbed and cannot be focused. In this case, if $\delta_1$ and/or $\delta_2$ are very small, K is not made large enough, and then beamforming in the ($\theta_r$, $\varphi_r$) direction is considered to be beyond the RIS capability. The determined $d_x$ and $d_y$, if less than $\lambda/10$, i.e. K $\delta_1>10$ and/or K $\delta_2>10$, need to reduce K, otherwise the Abbe limit is reached so that the RIS unit has a very strong correlation to reflections, i.e. a large K is not meaningful for beamforming.

Figure 3:
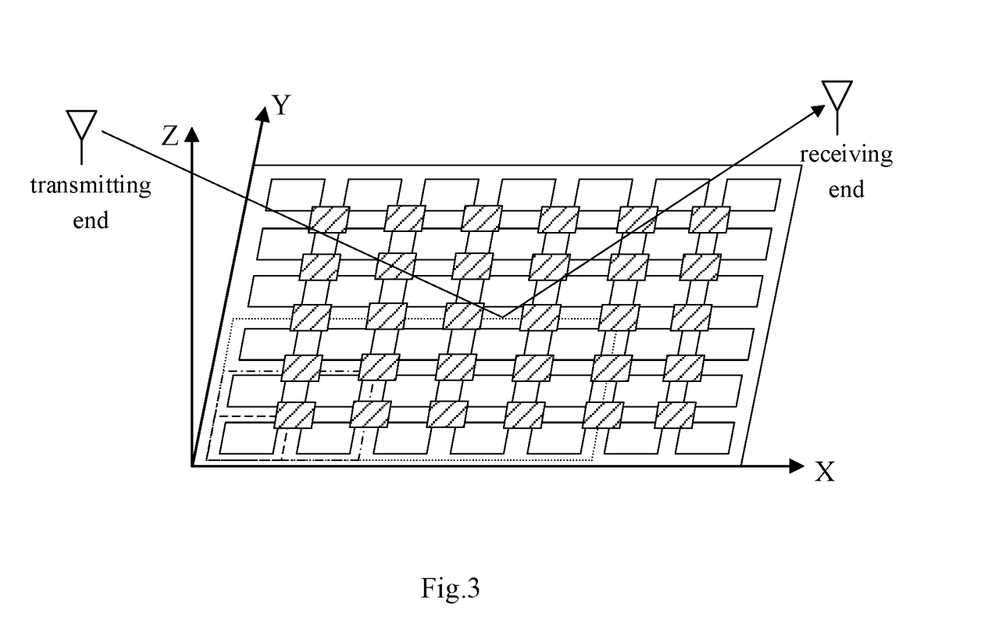
FIG. 3 is a second schematic view of an RIS in an embodiment of the present disclosure.

It should be noted that the above formulas for determining $d_x$ and $d_y$ are determined by setting RIS to be on the X-Y plane with the lower left corner as the origin of coordinates, as shown in FIG. 3. The first direction is the X-axis direction, and the second direction is the Y-axis direction. Of course, the setting adopted in the calculation process can be that the RIS is placed on an X-Y plane, an X-Z plane or a Y-Z plane, the origin of coordinates is any one of the center and four corners of the RIS, and the corresponding formulas are different, so the formulas are not limited to the above.

In addition, the principle of calculating the center distance between adjacent RIS units in other directions is the same as the principle of calculating the center distance between adjacent MS units in the first direction and the second direction of the MS unit, but the specific implementation is different, and the detailed description is omitted here.

Optionally, Step 102 includes:
configuring the RIS as the plurality of RIS units satisfying the setting parameter, through the plurality of connectors;
where each of the plurality of connectors is configured to perform at least one of:
controlling the plurality of RIS atoms around the connector to be unconnected;
controlling a part of the plurality of RIS atoms around the connector to be connected;
controlling the plurality of RIS atoms around the connector to be connected.

Here, various implementations of the RSI unit can be realized based on the structure of RIS in this embodiment and the connector can control the connection of a plurality of RIS atoms around itself.

Taking the RIS shown in FIG. 2 as an example, 4 RIS atoms surround 1 connector, and if the connector controls the 4 RIS atoms not to be connected, the 4 RIS atoms are respectively one RIS unit, and at this time, the RIS unit is 1 RIS atom, and the connector state can be recorded as 1; if the connector controls the connection of the left and right 2 RIS atoms of the 4 RIS atoms, the 4 RIS atoms are respectively an upper RIS unit and a lower RIS unit, and at this time, the state of the connector can be recorded as 2; if the connector controls the connection of the upper and lower 2 RIS atoms of the 4 RIS atoms, the 4 RIS atoms are respectively two RIS units at the left and the right, and at this time, the state of the connector can be recorded as 3; when the connector controls the connection of these 4 RIS atoms, the 4 RIS atoms form one RIS unit, and in this case, the connector state can be recorded as 4. By setting the state of the RIS connector, the setting of the size of the RIS unit can be achieved, which is equivalent to achieving the distance between the centers of two adjacent RIS units.

In general, for example, if the interval between the RIS unit centers in the column direction (i.e., $d_x$) is 5 times the length of the RIS atoms (column direction), and the interval between the RIS unit centers in the row direction (i.e., $d_y$) is 3 times the length of the RIS atoms (column direction), the RIS unit 4 shown in FIG. 2 can be obtained by selecting the RIS connectors from the first row to the fourth row in the first row, selecting the RIS connectors from the first row to the fourth row in the second row, selecting the RIS connectors from the first row to the fourth row in the third row in the second row in the fourth row in the second row in the fourth row in the fifth row in the third row in the RIS connector selection state 1. The RIS unit 4 includes 5 RIS atoms per row and 3 RIS atoms per column.

Specifically, if two RIS atoms are connected together by the RIS connector, the diode PIN in the two RIS atoms can be connected in series in the same direction by the RIS connector, namely the P of one PIN is connected with the N of the other PIN; the RIS connector can disconnect the PINs in two RIS atoms through the RIS connector if it is not desired to connect the two RIS atoms together.

For the RIS unit configured according to the setting parameters, correspondingly, in order to make it to perform the required reflection, optionally, after Step 101, the method further includes:
determining a reflection parameter of each RIS unit, according to RIS area information, RIS power consumption information and the setting parameter of each RIS unit.

Here, the RIS area information includes, but is not limited to, a total area of the RIS, and the RIS power consumption information includes, but is not limited to, a total power consumption of the RIS. In conjunction with the RIS area information, the RIS power consumption information and the setting parameter of the RIS unit, the reflection parameters of each RIS unit can be optimally set.

Optionally, the reflection parameters include: the reflection amplitude;
the determining the reflection parameter of each RIS unit according to the RIS area information, the RIS power consumption information and the setting parameter of each RIS unit includes:
calculating a reflection amplitude A of each RIS unit through a formula $$A = \sqrt{\frac{P*d_x*d_y}{S}};$$

where P is a power consumption of RIS, S is an area of RIS, $d_x$ is the center distance between two adjacent RIS units in the RIS first direction, $d_y$ is the center distance between two adjacent RIS units in the RIS second direction.

In this way, the reflection amplitudes can be calculated for the target RIS unit by the corresponding formulas, respectively. S is the total area of the RIS and P is the total power consumption of the RIS.

$$A = \sqrt{\frac{P * d_x * d_y}{S}}$$

is determined in combination with $M*N*d_x*d_y=S$, and $M*N*A\ 2=P$. M and N can also be calculated, M is the number of RIS units of RIS in the first direction of RIS, N is the number of RIS units of RIS in the second direction of RIS.

It should be noted that in the implementation using the RIS connector in this embodiment, the central distance of the RIS unit does not affect the total area of the RIS, but only the values of M and N.

Of course, the reflection parameters are not limited to the reflection amplitude, but also include the reflection phase shift, etc., which are not listed here.

Here, the magnitude $\phi_{n,m}$ of the reflected phase shift of the RIS unit can be expressed as $$\phi_{nm} = \frac{2\pi}{\lambda}(\delta_1 m d_x + \delta_2 n d_y),$$

m is the serial number of the RIS unit in the RIS first direction, and n is the serial number of the RIS unit in the RIS second direction.

After the RIS completes the setting of the RIS unit and the setting of the reflection parameter of each RIS unit, the RIS reports the state to the base station and starts to reflect the signal.

Figure 4:
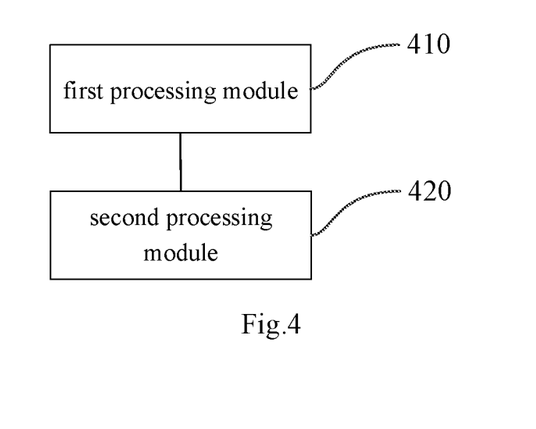
FIG. 4 is a block schematic view of a device in an embodiment of the present disclosure.

As shown in FIG. 4, a transmission control device is provided in an embodiment of the present disclosure, including a plurality of RIS atoms and a plurality of connectors, where each of the plurality of connectors is configured to control a connection state of the plurality of RIS atoms around the connector;

the device includes:
a first processing module 410, configured to determine a setting parameter of a RIS unit;
a second processing module 420, configured to determine the connection state of the plurality of RIS atoms around the connector according to the setting parameter, and determine the RIS unit according to the connection state;
where at least one of the RIS atoms constitutes one RIS unit, the setting parameter comprises a center distance between multiple RIS units.
Optionally, the device further includes:
an obtaining module, configured to obtain target information;
where the target information includes at least one of:
Channel State information (CSI);
transmitting end location information;
receiving end location information;
RIS location information;
RIS area information;
RIS power consumption information.

Optionally, the first processing module is further configured to:
determine the setting parameter of the RIS unit according to a first angle, a second angle, a third angle and a fourth angle;
the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.
Optionally, the center distance between multiple RIS units includes at least one of:
the center distance between two adjacent RIS units in a RIS first direction;
the center distance between two adjacent RIS units in a RIS second direction;
the determining the setting parameter of the RIS unit according to the first angle, the second angle, the third angle and the fourth angle includes:
calculating a first parameter $\delta_1$ through a formula $\delta_1 = \sin\theta_t \cos\varphi_t + \sin\theta_r \cos\varphi_r$;
calculating a second parameter $\delta_2$ through a formula $\delta_1 = \sin\theta_t \cos\varphi_t + \sin\theta_r \cos\varphi_r$;
determining $d_x$ and/or $d_y$ based on a RIS setting parameter table, where $d_x$ satisfies a formula $Kd_x=\lambda/\delta_1$, $d_y$ satisfies a formula $Kd_y=\lambda/\delta_2$;
where $\theta_t$ is the first angle, $\varphi_t$ is the second angle, $\theta_r$ is the third angle, $\varphi_r$ is the fourth angle, $d_x$ is the center distance between two adjacent RIS units in the RIS first direction, $d_y$ is the center distance between two adjacent RIS units in the RIS second direction, $\lambda$ is a wavelength, and K is a number of phase shifts.
Optionally, the device further includes:
a third processing module, configured to determine a reflection parameter of each RIS unit, according to RIS area information, RIS power consumption information and the setting parameter of each RIS unit.
Optionally, the reflection parameter includes a reflection amplitude;
the third processing module is further configured to:
calculate a reflection amplitude A of each RIS unit through a formula $$A = \sqrt{\frac{P * d_x * d_y}{S}};$$

where P is a power consumption of RIS, S is an area of RIS, $d_x$ is the center distance between two adjacent RIS units in the RIS first direction, $d_y$ is the center distance between two adjacent RIS units in the RIS second direction.

Optionally, the second processing module is configured to:
configure the RIS as the plurality of RIS units satisfying the setting parameter, through the plurality of connectors;
where each of the plurality of connectors is configured to perform at least one of:
controlling the plurality of RIS atoms around the connector to be unconnected;
controlling a part of the plurality of RIS atoms around the connector to be connected;
controlling the plurality of RIS atoms around the connector to be connected.

according to the device of the present disclosure, a setting parameter of a RIS unit is determined firstly, that is, a center distance between multiple RIS units is determined, then the connection state of the multiple RIS atoms around the connector can be further determined according to the setting parameter, and the RIS unit is determined according to the connection state, so that the RIS can be subsequently transmitted based on the obtained RIS unit, thereby realizing flexible setting of the RIS reflection coefficient, and reducing the cost for implementing and controlling the MS.

It should be noted that the apparatus is an apparatus to which the transmission control method is applied, and the implementation manner of the method embodiment is applicable to the apparatus, and the same technical effect can be achieved.

Figure 5:
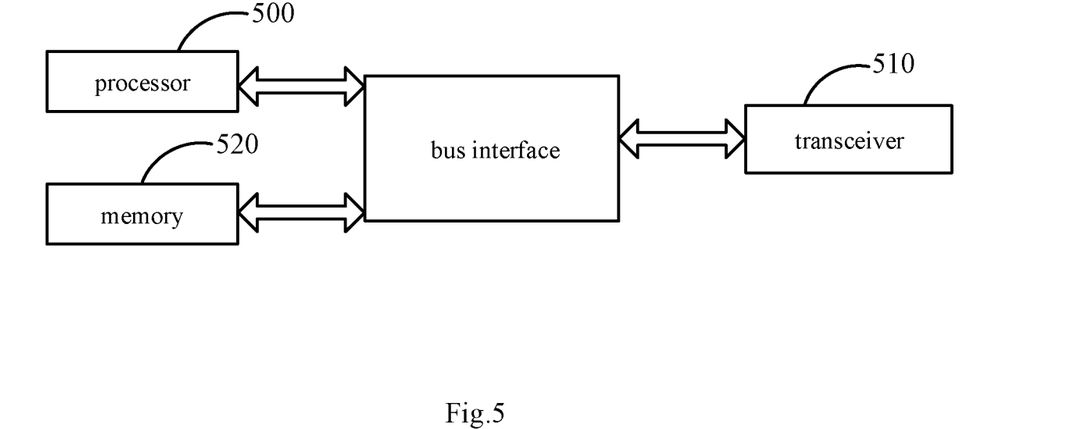
FIG. 5 is a block diagram of a device in an embodiment of the present disclosure.

As shown in FIG. 5, a transmission control device is provided in an embodiment of the present disclosure, including: a memory 520, a transceiver 510, a processor 500, where the memory 520 is configured to store program instructions, the transceiver 510 is configured to send and receive data under a control of the processor 500, and the processor 500 is configured to read the program instructions in the memory and perform:

determining a setting parameter of a RIS unit;

determining the connection state of the plurality of RIS atoms around the connector according to the setting parameter, and determining the RIS unit according to the connection state;

where at least one of the RIS atoms constitutes one RIS unit, the setting parameter comprises a center distance between multiple MS units.

Optionally, the processor is further configured to perform:

acquiring target information;

where the target information includes at least one of:

Channel State information (CSI);

transmitting end location information;

receiving end location information;

RIS location information;

RIS area information;

RIS power consumption information.

Optionally, the processor is further configured to perform:

determining the setting parameter of the RIS unit according to a first angle, a second angle, a third angle and a fourth angle;

the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.

Optionally, the center distance between multiple RIS units includes at least one of:

the center distance between two adjacent RIS units in a RIS first direction;

the center distance between two adjacent RIS units in a RIS second direction;

the determining the setting parameter of the RIS unit according to the first angle, the second angle, the third angle and the fourth angle includes:

calculating a first parameter $\delta_1$ through a formula $\delta_1 = \sin\theta_t \cos\varphi_t + \sin\theta_r \cos\varphi_r$;

calculating a second parameter $\delta_2$ through a formula $\delta_2 = \sin\theta_t \cos\varphi_t + \sin\theta_r \cos\varphi_r$;

determining $d_x$ and/or $d_y$ based on a RIS setting parameter table, where $d_x$ satisfies a formula $Kd_x = \lambda/\delta_1$, $d_y$ satisfies a formula $Kd_y = \lambda/\delta_2$;

where $\theta_t$ is the first angle, $\varphi_t$ is the second angle, $\theta_r$ is the third angle, $\varphi_r$ is the fourth angle, $d_x$ is the center distance between two adjacent RIS units in the RIS first direction, $d_y$ is the center distance between two adjacent RIS units in the RIS second direction, $\lambda$ is a wavelength, and K is a number of phase shifts.

Optionally, the reflection parameter includes a reflection amplitude;

the processor is further configured to perform:

calculating a reflection amplitude A of each RIS unit through a formula $$A = \sqrt{\frac{P * d_x * d_y}{S}};$$

where P is a power consumption of RIS, S is an area of RIS, $d_x$ is the center distance between two adjacent RIS units in the RIS first direction, $d_y$ is the center distance between two adjacent RIS units in the RIS second direction.

Optionally, the processor is further configured to perform:

configuring the RIS as the plurality of RIS units satisfying the setting parameter, through the plurality of connectors;

where each of the plurality of connectors is configured to perform at least one of:

controlling the plurality of RIS atoms around the connector to be unconnected;

controlling a part of the plurality of RIS atoms around the connector to be connected;

controlling the plurality of RIS atoms around the connector to be connected.

In FIG. 5 the bus architecture may include any number of interconnected buses and bridges, in particular one or more processors, represented by the processor 500, and various circuits, represented by the memory 520, linked together. The bus architecture may also link together various other circuits such as peripherals, voltage regulators, power management circuits, and the like, which are well known in the art, and therefore, will not be described any further herein. The bus interface provides an interface. The transceiver 510 may be a number of elements including a transmitter and receiver that provide a means for communicating with various other apparatus over a transmission medium including wireless channels, wired channels, fiber optic cables, and the like. The processor 500 is responsible for managing the bus architecture and general processing, and the memory 520 may store data used by the processor 510 in performing operations.

The processor 500 may be a Central Processing Unit (CPU), an Application Specific Integrated Circuit (ASIC), a Field Programmable Gate Array (FPGA), or a Complex Programmable Logic Device (CPLD), and may also have a multi-core architecture.

According to the embodiment of the present disclosure, a setting parameter of a RIS unit is determined firstly, that is, a center distance between multiple RIS units is determined, then the connection state of the multiple RIS atoms around the connector can be further determined according to the setting parameter, and the RIS unit is determined according to the connection state, so that the RIS can be subsequently transmitted based on the obtained RIS unit, thereby realizing flexible setting of the RIS reflection coefficient, and reducing the cost for implementing and controlling the MS.

It should be noted that the device provided in the embodiment of the present disclosure can implement all the method steps implemented by the method embodiment, and can achieve the same technical effects, and detailed descriptions of the same parts and beneficial effects as the method embodiment in this embodiment are not repeated herein.

It should be noted that, in the embodiment of the present disclosure, the division of the unit is schematic, and is only one logic function division, and when the actual implementation is realized, another division manner may be provided. In addition, functional units in the embodiments of the present disclosure may be integrated into one processing unit, or each unit may exist alone physically, or two or more units are integrated into one unit. The integrated unit may be implemented in the form of hardware, or may also be implemented in the form of a software functional unit.

The integrated unit, if implemented as a software functional unit and sold or used as a stand-alone product, may be stored in a processor readable storage medium. Based on such understanding, the technical solutions of the present disclosure, in essence or part of the technical solutions contributing to the related art, or all or part of the technical solutions, may be embodied in the form of a software product, which is stored in a storage medium and includes several instructions for causing a computer device (which may be a personal computer, a server, a network device, or the like) or a processor (processor) to execute all or part of the steps of the methods described in the embodiments of the present disclosure. The aforementioned storage medium includes: a U-disk, a removable hard disk, a Read-Only Memory (ROM), a Random Access Memory (RAM), a magnetic disk, an optical disk, or other various media capable of storing program codes.

It should be noted that the apparatus provided in the embodiment of the present disclosure can implement all the method steps implemented by the method embodiment, and can achieve the same technical effects, and detailed descriptions of the same parts and beneficial effects as the method embodiment in this embodiment are not repeated herein.

As shown in FIG. 2, an embodiment of the present disclosure further provides an reconfigure intelligent surface, for performing the transmission control method hereinabove, where the reconfigure intelligent surface includes a plurality of RIS atoms 2 and a plurality of connectors 3, where each of the plurality of connectors is configured to control a connection state of the plurality of RIS atoms around the connector;

at least one of the RIS atoms 2 constitutes one RIS unit 4.

Optionally, the connector is configured to perform at least one of:

controlling the plurality of RIS atoms around the connector to be unconnected;

controlling a part of the plurality of RIS atoms around the connector to be connected;

controlling the plurality of RIS atoms around the connector to be connected.

According to the transmission control method in the above embodiment of the present disclosure, a setting parameter of a RIS unit is determined firstly, that is, a center distance between multiple RIS units is determined, then the connection state of the multiple RIS atoms around the connector can be further determined according to the setting parameter, and the RIS unit is determined according to the connection state, so that the RIS can be subsequently transmitted based on the obtained RIS unit, thereby realizing flexible setting of the RIS reflection coefficient, and reducing the cost for implementing and controlling the RIS.

In some embodiments of the present disclosure, a processor-readable storage medium storing program instructions is provided in an embodiment of the present disclosure, for causing the processor to perform steps of:

determining the setting parameter of the RIS unit;

determining a connection state of a plurality of RIS atoms around a connector according to the setting parameter, and determining the RIS unit according to the connection state;

where the setting parameters include: center distance of multiple RIS units.

When executed by the processor, the program instructions may implement all the implementation manners applied to the embodiment of the transmission control method shown in FIG. 1, and are not described herein again to avoid repetition.

Embodiments of the present disclosure relate to a receiving end and/or a transmitting end, which may be terminal devices, such as devices that provide voice and/or data connectivity to a user, handheld devices with wireless connectivity, or other processing devices connected to a wireless modem, etc. In different systems, the names of the terminal devices may be different, for example, in a 5G system, the terminal device may be referred to as a User Equipment (UE). A wireless terminal device, which may be a mobile terminal device such as a mobile telephone (or "cellular" telephone) and a computer having a mobile terminal device, e.g., a portable, pocket, hand-held, computer-included or vehicle-mounted mobile device, may communicate with one or more Core Networks (CNs) via a Radio Access Network (RAN), and may exchange language and/or data with the Radio Access Network. Examples of such devices include Personal Communication Service (PCS) phones, cordless phones, Session Initiation Protocol (SIP) phones, Wireless Local Loop (WLL) stations, Personal Digital Assistants (PDAs), and the like. The wireless terminal device may also be referred to as a system, a subscriber unit (subscriber unit), a subscriber station (subscriber station), a mobile station (mobile station), a remote station (remote station), an access point (access point), a remote terminal (remote terminal), an access terminal (access terminal), a user terminal (user terminal), a user agent (user agent), and a user device (user device), which is not limited in this embodiment.

The receiving end and/or the transmitting end related to the embodiment of the present disclosure may be a network device, such as a base station, and the base station may include multiple cells that provide services for a terminal. A base station may also be called an access point, or may be a device in an access network that communicates over the air-interface, through one or more sectors, with wireless terminal devices, or by other names, depending on the particular application. The network device may be configured to exchange received air frames and Internet Protocol (IP) packets with one another as a router between the wireless terminal device and the rest of the access network, which may include an Internet Protocol (IP) communications network. The network device may also coordinate attribute management for the air interface. For example, the network device according to the embodiment of the present disclosure may be a Base Transceiver Station (BTS) in a Global System for Mobile communications (GSM) or Code Division Multiple Access (CDMA), may be a network device (NodeB) in a Wideband Code Division Multiple Access (WCDMA), may be an evolved Node B (eNB or e-NodeB) in a Long Term Evolution (LTE) System, may be a 5G Base Station (gNB) in a 5G network architecture (next generation System), may be a Home evolved Node B (Home Node B, HeNB), a relay Node (relay Node), a Home Base Station (femto), a pico Base Station (pico) and the like, and is not limited in the embodiments of the present disclosure. In some network configurations, a network device may include Centralized Unit (CU) nodes and Distributed Unit (DU) nodes, which may also be geographically separated.

Multiple Input Multiple Output (MIMO) transmission may be performed between the network device and the terminal device by using one or more antennas, where the MIMO transmission may be Single User MIMO (SU-MIMO) or Multi-User MIMO (MU-MIMO). According to the form and the number of the root antenna combination, the MIMO transmission can be 2D-MIMO, FD-MIMO or massive-MIMO, and can also be diversity transmission, precoding transmission, beamforming transmission, etc.

As will be appreciated by one skilled in the art, embodiments of the present disclosure may be provided as a method, system, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-usable storage media (including, but not limited to, disk storage, optical storage, and the like) having computer-usable program code embodied therein.

The present disclosure is described with reference to flowchart illustrations and/or block diagrams of methods, apparatus (systems), and computer program products according to embodiments of the application. It will be understood that each flow and/or block of the flowchart illustrations and/or block diagrams, and combinations of flows and/or blocks in the flowchart illustrations and/or block diagrams, can be implemented by computer-executable instructions. These computer-executable instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart flow or flows and/or block diagram block or blocks.

These processor-executable instructions may also be stored in a processor-readable memory that can direct a computer or other programmable data processing apparatus to function in a particular manner, such that the instructions stored in the processor-readable memory produce an article of manufacture including instruction means which implement the function specified in the flowchart flow or flows and/or block diagram block or blocks.

These processor-executable instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

It will be apparent to those skilled in the art that various changes and modifications may be made in the present disclosure without departing from the spirit and scope of the application. Thus, if such modifications and variations of the present disclosure fall within the scope of the claims of the present disclosure and their equivalents, the present disclosure is intended to include such modifications and variations as well.

The foregoing is illustrative of only alternative embodiments of the disclosure, and it will be appreciated by those skilled in the art that various modifications and adaptations can be made without departing from the principles of the disclosure and are intended to be within the scope of the disclosure.

What is claimed is:

1. A transmission control method, performed by a reconfigure intelligent surface (RIS) comprising a plurality of RIS atoms and a plurality of connectors, wherein each connector of the plurality of connectors is configured to control a connection state of the plurality of RIS atoms around the connector;

the method comprises:
determining a setting parameter of a RIS unit;
determining the connection state of the plurality of RIS atoms around the connector according to the setting parameter, and determining the RIS unit according to the connection state;
wherein at least one of the plurality of RIS atoms constitutes one RIS unit, the setting parameter comprises a center distance between multiple RIS units.

2. The method according to claim 1, wherein prior to the determining the setting parameter of the RIS unit, the method further comprises:
obtaining target information;
wherein the target information comprises at least one of:
Channel State information (CSI);
transmitting end location information;
receiving end location information;
RIS location information;
RIS area information;
RIS power consumption information.

3. The method according to claim 1, wherein the determining the setting parameter of the RIS unit comprises:
determining the setting parameter of the RIS unit according to a first angle, a second angle, a third angle and a fourth angle;
the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.

4. The method according to claim 3, wherein the center distance between multiple RIS units comprises at least one of:
the center distance between two adjacent RIS units in a RIS first direction;
the center distance between two adjacent RIS units in a RIS second direction;
the determining the setting parameter of the RIS unit according to the first angle, the second angle, the third angle and the fourth angle comprises:
calculating a first parameter $\delta_1$ through a formula $\delta_1 = \sin\theta_t \cos\varphi_t + \sin\theta_r \cos\varphi_r$;
calculating a second parameter $\delta_2$ through a formula $\delta_2 = \sin\theta_t \sin\varphi_t + \sin\theta_r \sin\varphi_r$;
determining $d_x$ and/or $d_y$ based on a RIS setting parameter table, wherein $d_x$ satisfies a formula $Kd_x = \lambda/\delta_1$, $d_y$ satisfies a formula $Kd_y = \lambda/\delta_2$;
wherein $\theta_t$ is the first angle, $\varphi_t$ is the second angle, $\theta_r$ is the third angle, $\varphi_r$ is the fourth angle, $d_x$ is the center distance between two adjacent RIS units in the RIS first direction, $d_y$ is the center distance between two adjacent RIS units in the RIS second direction, $\lambda$ is a wavelength, and K is a number of phase shifts.

5. The method according to claim 1, wherein subsequent to the determining the setting parameter of the RIS unit, the method further comprises:
determining a reflection parameter of each RIS unit, according to RIS area information, RIS power consumption information and the setting parameter of each RIS unit.

6. The method according to claim 5, wherein the reflection parameter comprises a reflection amplitude;
the determining the reflection parameter of each RIS unit according to the RIS area information, the RIS power consumption information and the setting parameter of each RIS unit comprises:
calculating a reflection amplitude A of each RIS unit through a formula $$A = \sqrt{\frac{P * d_x * d_y}{S}};$$

wherein P is a power consumption of RIS, S is an area of RIS, $d_x$ is the center distance between two adjacent RIS units in the RIS first direction, $d_y$ is the center distance between two adjacent RIS units in the RIS second direction.

7. The method according to claim 1, wherein the determining the connection state of the plurality of RIS atoms around the connector and determining the RIS unit according to the connection state comprises:
configuring the RIS as the plurality of RIS units satisfying the setting parameter, through the plurality of connectors;
wherein each of the plurality of connectors is configured to perform at least one of:
controlling the plurality of RIS atoms around the connector to be unconnected;
controlling a part of the plurality of RIS atoms around the connector to be connected;
controlling the plurality of RIS atoms around the connector to be connected.

8. A reconfigure intelligent surface, for performing the transmission control method according to claim 1, wherein the reconfigure intelligent surface comprises a plurality of RIS atoms and a plurality of connectors,
wherein each connector of the plurality of connectors is configured to control a connection state of the plurality of RIS atoms around the connector;
at least one of the plurality of RIS atoms constitutes one RIS unit.

9. The reconfigure intelligent surface according to claim 8, wherein the connector is configured to perform at least one of:
controlling the plurality of RIS atoms around the connector to be unconnected;
controlling a part of the plurality of RIS atoms around the connector to be connected;
controlling the plurality of RIS atoms around the connector to be connected.

10. A transmission control device, comprising: a memory, a transceiver, a processor;
where the memory is configured to store program instructions, the transceiver is configured to send and receive data under a control of the processor, and the processor is configured to read the program instructions in the memory to perform:
determining a setting parameter of a reconfigure intelligent surface (RIS) unit;
determining a connection state of a plurality of RIS atoms around a connector according to the setting parameter, and determining the RIS unit according to the connection state;
wherein at least one of the plurality of RIS atoms constitutes one RIS unit, the setting parameter comprises a center distance between multiple RIS units.

11. The transmission control device according to claim 10, wherein prior to the determining the setting parameter of the RIS unit, the processor is configured to read the program instructions in the memory to perform:
obtaining target information;
wherein the target information comprises at least one of:
Channel State information (CSI);
transmitting end location information;
receiving end location information;
RIS location information;
RIS area information;
RIS power consumption information.

12. The transmission control device according to claim 10, wherein the processor is configured to read the program instructions in the memory to perform:
determining the setting parameter of the RIS unit according to a first angle, a second angle, a third angle and a fourth angle;
the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.

13. The transmission control device according to claim 12, wherein the center distance between multiple RIS units comprises at least one of:
the center distance between two adjacent RIS units in a RIS first direction;
the center distance between two adjacent RIS units in a RIS second direction;
the processor is configured to read the program instructions in the memory to perform:
calculating a first parameter $\delta_1$ through a formula $\delta_1 = \sin \theta_t \cos \varphi_t + \sin \theta_r \cos \varphi_r$;
calculating a second parameter $\delta_2$ through a formula $\delta_1 = \sin \theta_t \sin \varphi_t + \sin \theta_r \sin \varphi_r$;
determining $d_x$ and/or $d_y$ based on a RIS setting parameter table, wherein $d_x$ satisfies a formula $Kd_x = \lambda/\delta_1$, $d_y$ satisfies a formula $Kd_y = \lambda/\delta_2$;
wherein $\theta_t$ is the first angle, $\varphi_t$ is the second angle, $\theta_r$ is the third angle, $\varphi_r$ is the fourth angle, $d_x$ is the center distance between two adjacent RIS units in the RIS first direction, $d_y$ is the center distance between two adjacent RIS units in the RIS second direction, $\lambda$ is a wavelength, and K is a number of phase shifts.

14. The transmission control device according to claim 10, wherein subsequent to the determining the setting parameter of the RIS unit, the processor is configured to read the program instructions in the memory to perform:
determining a reflection parameter of each RIS unit, according to RIS area information, RIS power consumption information and the setting parameter of each RIS unit.

15. The transmission control device according to claim 14, wherein the reflection parameter comprises a reflection amplitude;
the processor is configured to read the program instructions in the memory to perform:
calculating a reflection amplitude A of each RIS unit through a formula $$A = \sqrt{\frac{P * d_x * d_y}{S}};$$

wherein P is a power consumption of RIS, S is an area of RIS, $d_x$ is the center distance between two adjacent RIS units in the RIS first direction, $d_y$ is the center distance between two adjacent RIS units in the RIS second direction.

16. The transmission control device according to claim 10, wherein the processor is configured to read the program instructions in the memory to perform:
configuring the RIS as the plurality of RIS units satisfying the setting parameter, through the plurality of connectors;
wherein each of the plurality of connectors is configured to perform at least one of:
controlling the plurality of RIS atoms around the connector to be unconnected;
controlling a part of the plurality of RIS atoms around the connector to be connected;
controlling the plurality of RIS atoms around the connector to be connected.

17. A non-transitory processor-readable storage medium, wherein the non-transitory processor-readable storage medium stores a computer program, the computer program is executed by a processor to perform:
determining a setting parameter of a reconfigure intelligent surface (RIS) unit;
determining a connection state of a plurality of RIS atoms around a connector according to the setting parameter, and determining the RIS unit according to the connection state;
wherein at least one of the plurality of RIS atoms constitutes one RIS unit, the setting parameter comprises a center distance between multiple RIS units.

18. The non-transitory processor-readable storage medium according to claim 17, wherein prior to the determining the setting parameter of the RIS unit, the computer program is executed by the processor to perform:
obtaining target information;
wherein the target information comprises at least one of:
Channel State information (CSI);
transmitting end location information;
receiving end location information;
RIS location information;
RIS area information;
RIS power consumption information.

19. The non-transitory processor-readable storage medium according to claim 17, wherein the computer program is executed by the processor to perform:
determining the setting parameter of the RIS unit according to a first angle, a second angle, a third angle and a fourth angle;
the first angle is a lifting angle from a RIS center to a transmitting end, the second angle is a horizontal angle from the RIS center to the transmitting end, the third angle is a lifting angle from the RIS center to a receiving end, and the fourth angle is a horizontal angle from the RIS center to the receiving end.

* * * * *